(12) United States Patent
Chaiken et al.

(10) Patent No.: US 11,599,436 B2
(45) Date of Patent: Mar. 7, 2023

(54) SYSTEMS AND METHODS FOR REPAIRING CORRUPTION TO BIOS BOOT CRITICAL MEMORY VARIABLES

(71) Applicant: Dell Products L.P., Round Rock, TX (US)

(72) Inventors: Craig L. Chaiken, Pflugerville, TX (US); Siva Subramaniam Rajan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 92 days.

(21) Appl. No.: 17/189,810

(22) Filed: Mar. 2, 2021

(65) Prior Publication Data

US 2022/0283918 A1    Sep. 8, 2022

(51) Int. Cl.
| | | |
|---|---|---|
| G06F 11/22 | (2006.01) | |
| G06F 9/4401 | (2018.01) | |
| G06F 11/14 | (2006.01) | |
| G06F 13/36 | (2006.01) | |
| G06F 11/07 | (2006.01) | |

(52) U.S. Cl.
CPC ........ G06F 11/2284 (2013.01); G06F 9/4401 (2013.01); G06F 11/079 (2013.01); G06F 11/0793 (2013.01); G06F 11/1417 (2013.01); G06F 13/36 (2013.01); *G06F 2201/805* (2013.01)

(58) Field of Classification Search
CPC .. G06F 11/2284; G06F 9/4401; G06F 11/079; G06F 11/0793; G06F 11/1417; G06F 2201/805
See application file for complete search history.

(56) References Cited

U.S. PATENT DOCUMENTS

| | | | | |
|---|---|---|---|---|
| 2001/0052067 A1* | 12/2001 | Klein | .................... | G06F 9/4401 713/1 |
| 2013/0227356 A1* | 8/2013 | Kim | .................... | G06F 11/0742 714/48 |
| 2015/0089209 A1* | 3/2015 | Jacobs | .................. | G06F 21/575 713/1 |
| 2015/0378846 A1* | 12/2015 | Hagiwara | ........... | G06F 11/1438 714/19 |
| 2016/0124753 A1* | 5/2016 | Tsirkin | .................. | G06F 9/4408 713/2 |

(Continued)

FOREIGN PATENT DOCUMENTS

WO    WO 2022/154795 A1 *    7/2022    ............ C06F 9/4401

*Primary Examiner* — Bryce P Bonzo
*Assistant Examiner* — Michael Xu
(74) *Attorney, Agent, or Firm* — Jackson Walker L.L.P.

(57) ABSTRACT

An information handling system may include a processor and a basic input/output system (BIOS) comprising a program of instructions executable on the processor, the basic input/output system configured to, upon occurrence of a predetermined number of failures to complete a power-on/self-test (POST) of the information handling system: for each particular critical boot variable of the BIOS stored in a memory associated with the BIOS, read a backup variable for the particular critical boot variable, if available, and write a value of the backup variable as the critical boot variable; and attempt to reboot the information handling system with values of the backup variables used for the critical boot variables.

12 Claims, 4 Drawing Sheets

(56) References Cited

U.S. PATENT DOCUMENTS

| | | | |
|---|---|---|---|
| 2016/0335071 A1* | 11/2016 | Ham | G06F 8/65 |
| 2017/0123923 A1* | 5/2017 | Chang | G06F 11/142 |
| 2017/0123927 A1* | 5/2017 | Su | G06F 9/4403 |
| 2019/0227876 A1* | 7/2019 | Dardis | G06F 8/71 |
| 2020/0089572 A1* | 3/2020 | Bodner | G06F 11/2284 |
| 2020/0159302 A1* | 5/2020 | Chaiken | G06F 1/24 |
| 2021/0034733 A1* | 2/2021 | Grobelny | G06F 21/44 |
| 2022/0137982 A1* | 5/2022 | Samuel | G06F 9/4401 713/2 |

* cited by examiner

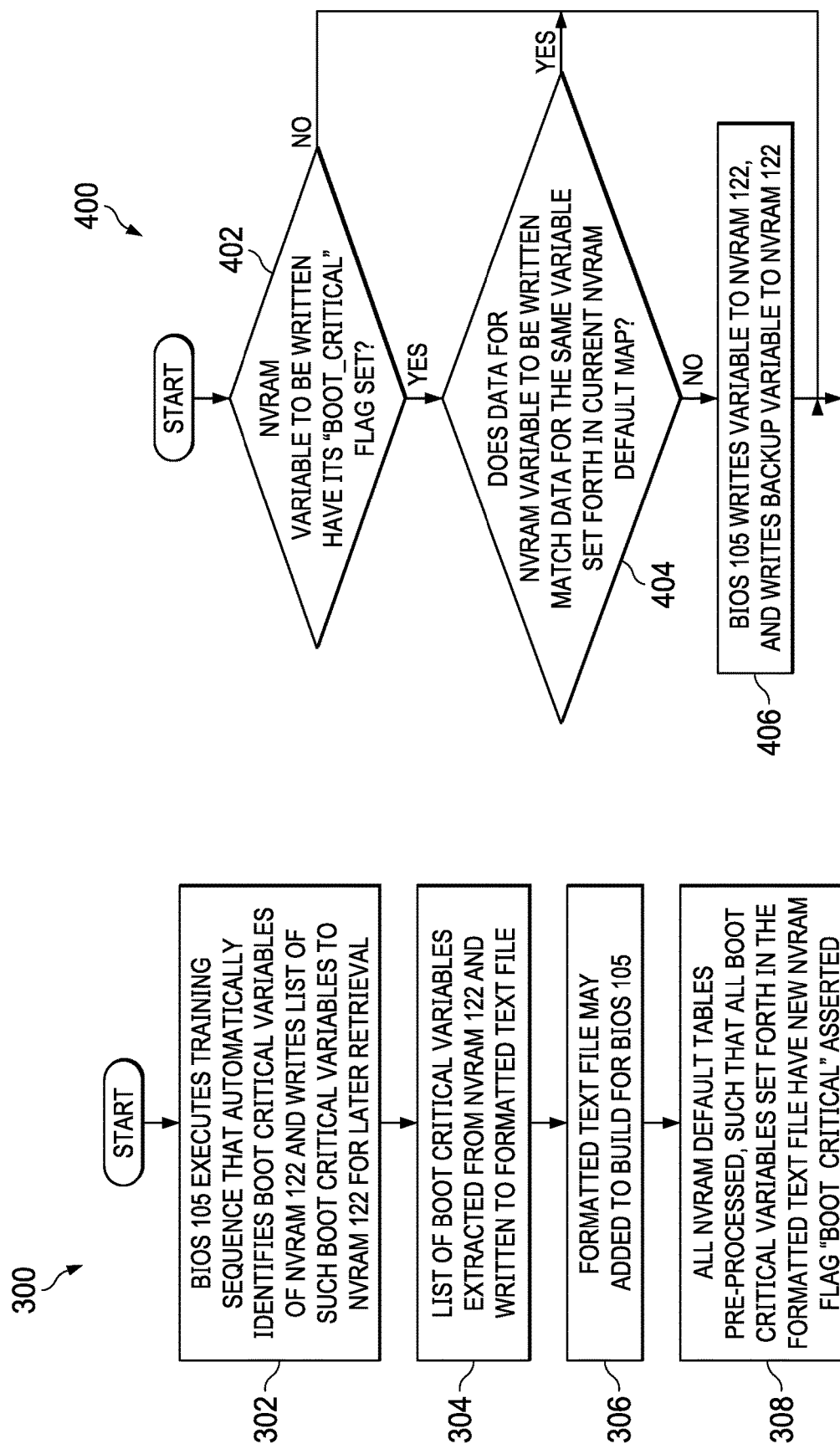

SYSTEMS AND METHODS FOR REPAIRING CORRUPTION TO BIOS BOOT CRITICAL MEMORY VARIABLES

TECHNICAL FIELD

The present disclosure relates in general to information handling systems, and more particularly to methods and systems for repairing corruption to boot critical memory variables in a basic input/output system (BIOS).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Corruption of a non-volatile read access memory (NVRAM) associated with BIOS may lead to a no power or no power-on/self-test (POST) failure in an information handling system. Many NVRAM corruption failures may be caused by changes in a definition of multi-field NVRAM variables that may occur from one BIOS revision to another. For instance, a BIOS may integrate new memory of chipset reference code and such code may add or subtract a field from an existing NVRAM variable. When the updated BIOS attempts to access an NVRAM field that was created with an earlier BIOS version, the field may be read from the wrong offset, so the data read will be corrupted, even though the original data is still intact. The corruption is not limited to the altered field; all subsequent fields in the NVRAM variable may also be corrupted. For example, if the third field in a 100-field NVRAM variable changes from one byte to two bytes in length, fields 3 through 100 may be read from the incorrect offset. The number of opportunities for an NVRAM field alignment change may increase as the user skips more BIOS revisions. As a result, if a customer that usually ignores BIOS updates finally installs the latest BIOS two or three years after receiving an information handling system (as may often occur with critical security updates), a reasonable chance exists that an NVRAM alignment change may result in NVRAM corruption.

Another common cause for NVRAM corruption failures may be single bit failures on a Serial Peripheral Interface (SPI) flash memory chip used to implement NVRAM. About one in 200 SPI flash memory chips encounter a single bit failure each year. If a single bit failure occurs inside an NVRAM variable, the NVRAM variable may return the incorrect value when read. If the corrupted variable is required to boot the information handling system, the information handling system may not complete POST.

SUMMARY

In accordance with the teachings of the present disclosure, the disadvantages and problems associated with corruption of NVRAM variables in BIOS may be reduced or eliminated.

In accordance with embodiments of the present disclosure, an information handling system may include a processor and a basic input/output system (BIOS) comprising a program of instructions executable on the processor, the basic input/output system configured to, upon occurrence of a predetermined number of failures to complete a power-on/self-test (POST) of the information handling system: for each particular critical boot variable of the BIOS stored in a memory associated with the BIOS, read a backup variable for the particular critical boot variable, if available, and write a value of the backup variable as the critical boot variable; and attempt to reboot the information handling system with values of the backup variables used for the critical boot variables.

In accordance with these and other embodiments of the present disclosure, a method may include, in an information handling system comprising a processor and a basic input/output system (BIOS) comprising a program of instructions executable on the processor, upon occurrence of a predetermined number of failures to complete a power-on/self-test (POST) of the information handling system: for each particular critical boot variable of the BIOS stored in a memory associated with the BIOS, reading a backup variable for the particular critical boot variable, if available, and writing a value of the backup variable as the critical boot variable; and attempting to reboot the information handling system with values of the backup variables used for the critical boot variables.

In accordance with these and other embodiments of the present disclosure, an article of manufacture may include a non-transitory computer-readable medium, and computer-executable instructions carried on the computer-readable medium, the instructions readable by a processor, the instructions, when read and executed, for causing the processor to, in a basic input/output system (BIOS) of an information handling system, upon occurrence of a predetermined number of failures to complete a power-on/self-test (POST) of the information handling system: for each particular critical boot variable of the BIOS stored in a memory associated with the BIOS, read a backup variable for the particular critical boot variable, if available, and write a value of the backup variable as the critical boot variable; and attempt to reboot the information handling system with values of the backup variables used for the critical boot variables.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a flowchart of an example method for adding definition of boot critical variables during product development of an information handling system, in accordance with embodiments of the present disclosure;

FIG. 4 illustrates a flowchart of an example method for a write operation of a variable to an NVRAM associated with a BIOS, in accordance with embodiments of the present disclosure.

DETAILED DESCRIPTION

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
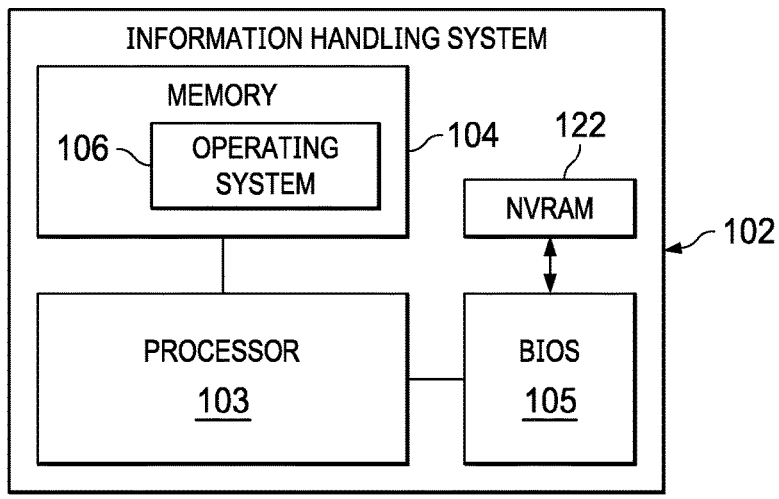
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, and a non-volatile memory (NVRAM) 122 communicatively coupled to BIOS 105.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., a network interface for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

NVRAM 122 may include any system, device, or apparatus configured to retain program instructions and/or data for a period of time, and may include non-volatile memory that retains data after power to information handling system 102 is turned off. For example, in some embodiments, NVRAM 122 may comprise a SPI flash storage device. In some embodiments, NVRAM 122 may store thereon one or more firmware images, including firmware for BIOS 105, configuration code, BIOS variables, other executable code, or other data.

In addition to processor 103, memory 104, BIOS 105, and NVRAM 122, information handling system 102 may include one or more other information handling resources.

In operation, as described in greater detail below, BIOS 105 may execute a training process during BIOS development which may identify a list of NVRAM variables, referred to herein as "boot critical variables", that may prevent UEFI BIOS from completing POST. BIOS 105 may denote all "boot critical Variables" with a new NVRAM flag referred to herein as "BOOT_CRITICAL." Every time an NVRAM variable flagged "BOOT_CRITICAL" is updated to a non-default value, BIOS 105 may create or replace a backup variable for such boot critical variable. If a UEFI BIOS fails to complete POST a predefined number of times:

1) BIOS 105 may delete any NVRAM variables associated with hardware training, such as the memory reference code or Peripheral Component Interconnect Express (PCIe) training, which may force variable retraining to occur.

2) BIOS 105 may also attempt to recover all boot critical variables from their respective backup variables, which may recover boot critical variables that have been corrupted after being written.

3) If the configuration using backup variables fails to boot, BIOS 105 may restore all boot critical variables from an active NVRAM default table, which may restore boot critical variables to defaults but leave all other NVRAM variables untouched, thus meaning that almost all user-modified settings may remain unaffected.

Figure 2A:
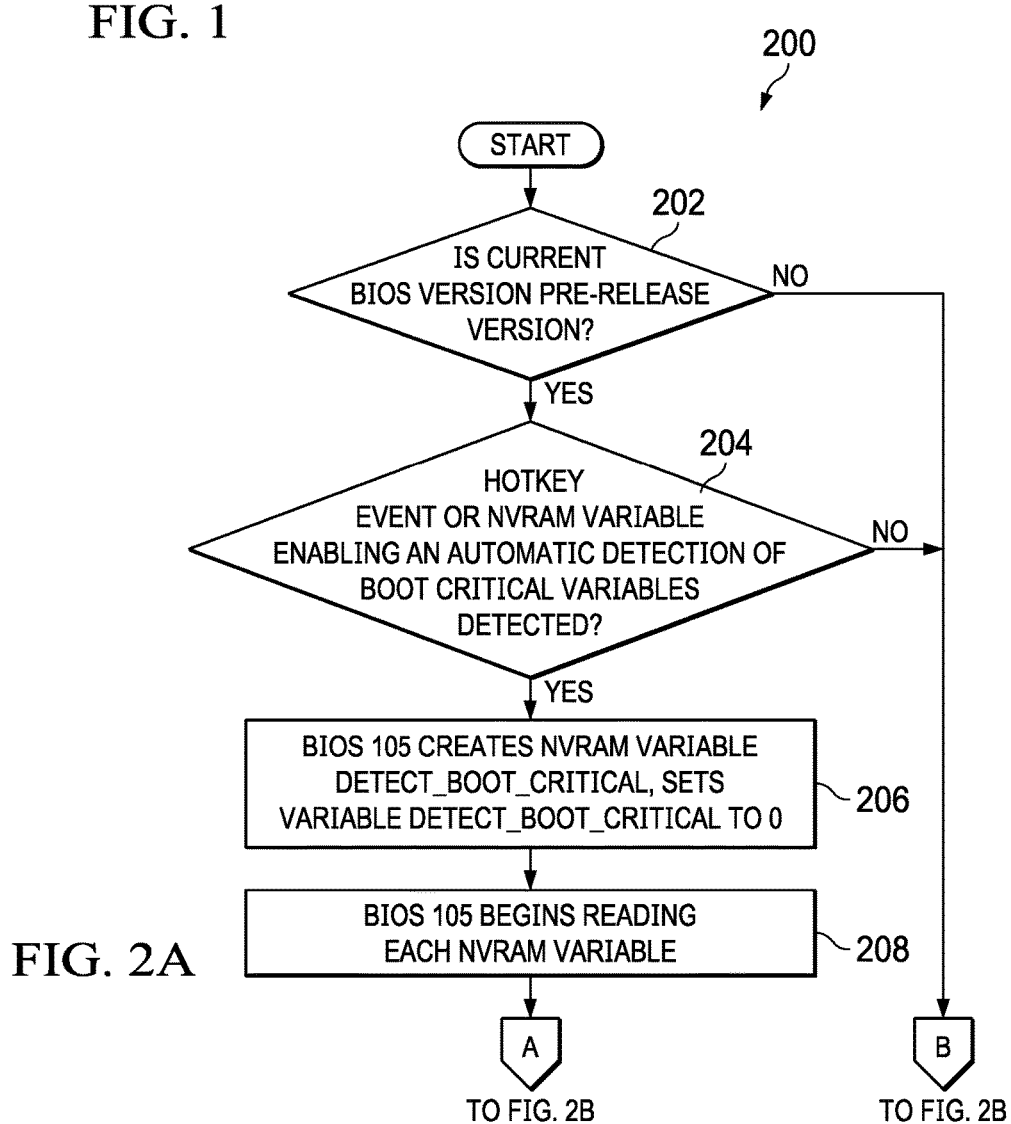
FIGS. 2A and 2B, hereinafter referred to as FIG. 2, illustrate a flowchart of an example method for automatically detecting boot critical variables during product development of an information handling system, in accordance with embodiments of the present disclosure.
Figure 2B:
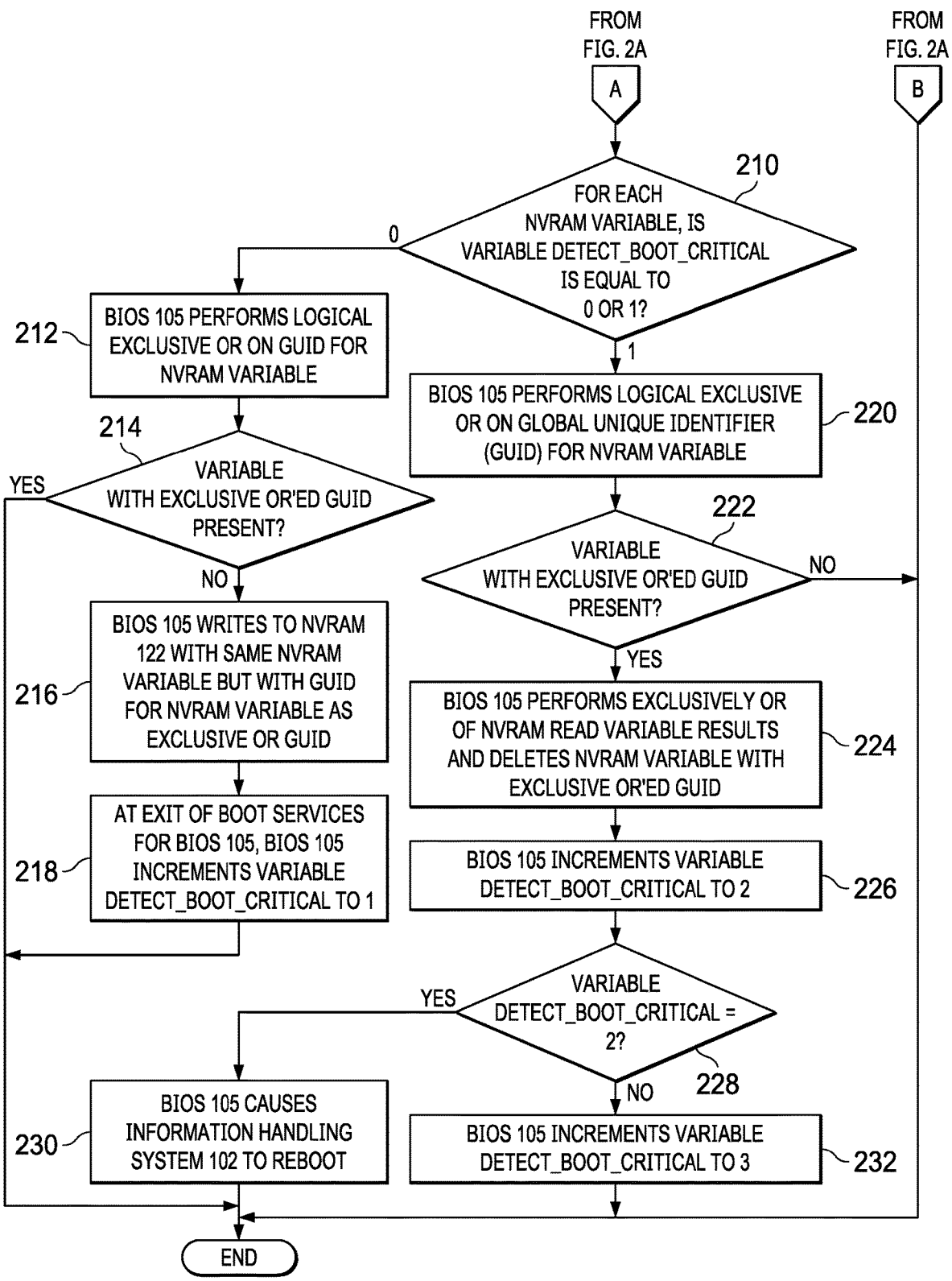

FIG. 2 illustrates a flowchart of an example method 200 for automatically detecting boot critical variables during product development of information handling system 102, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, during a boot of information handling system 102 during product development, BIOS 105 may detect if the current BIOS version is a pre-release version (e.g., non-A-rev BIOS). If the current BIOS version is a pre-release version, method 200 may proceed to step 204. Otherwise, method 200 may end.

At step 204, BIOS 105 may monitor for a hotkey event or an NVRAM variable enabling an automatic detection of boot critical variables. If such a hotkey or variable is detected, method 200 may proceed to step 206. Otherwise, method 200 may end.

At step 206, BIOS 105 may create an NVRAM variable, referred to herein as "detect_boot_critical," and set variable detect_boot_critical to 0.

At step 208, BIOS 105 may begin reading each NVRAM variable. At step 210, for each NVRAM variable, BIOS 105 may determine if variable detect_boot_critical is equal to 0 or 1. If variable detect_boot_critical is equal to 0, method 200 may proceed to step 212. Otherwise, if variable detect_boot_critical is equal to 1, method 200 may proceed to step 220.

At step 212, BIOS 105 may perform a logical exclusive OR on the global unique identifier (GUID) for the NVRAM variable. At step 214, BIOS 105 may determine if a variable with the exclusive OR'ed GUID is present. If a variable with the exclusive OR'ed GUID is present, method 200 may end. Otherwise, method 200 may proceed to step 216.

At step 216, BIOS 105 may write to NVRAM 122 with the same NVRAM variable but with the GUID for the NVRAM variable as the exclusive OR GUID. At step 218, at an exit of boot services for BIOS 105, BIOS 105 may increment variable detect_boot_critical to 1. After completion of step 218, method 200 may end.

At step 220, BIOS 105 may perform a logical exclusive OR on the GUID for the NVRAM variable. At step 222, BIOS 105 may determine if a variable with the exclusive OR'ed GUID is present. If a variable with the exclusive OR'ed GUID is not present, method 200 may end. Otherwise, method 200 may proceed to step 224.

At step 224, BIOS 105 may exclusively OR the NVRAM read variable results and may delete the NVRAM variable with the exclusive OR'ed GUID. At step 226, BIOS 105 may increment variable detect_boot_critical to 2, so that no other NVRAM value will be exclusively OR'ed on the present boot.

At step 228, when BIOS 105 reaches exit of boot services for BIOS 105, BIOS 105 may determine if variable detect_boot_critical equals 2. If variable detect_boot_critical equals 2, method 200 may proceed to step 230. Otherwise, method 200 may proceed to step 232.

At step 230, BIOS 105 may cause information handling system 102 to reboot, after which method 200 may end.

At step 232, BIOS 105 may increment variable detect_boot_critical to 3, indicating that all boot time NVRAM variables have been tested for criticality. After completion of step 232, method 200 may end.

During this detection of critical boot variables, exclusive OR'ing may be used on the NVRAM variable contents to toggle every bit in the NVRAM variable. The original bit contents of the NVRAM variable are the settings most likely to boot, so conversely, toggling every bit in an NVRAM variable results in the least likely configuration to boot. In these and other embodiments, other approaches could be used to corrupt NVRAM variables. For example, to corrupt an NVRAM variable, the NVRAM variable could be be replaced with a random value, or all zeroes, or all ones.

Although FIG. 2 discloses a particular number of steps to be taken with respect to method 200, it may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

FIG. 3 illustrates a flowchart of an example method 300 for adding definition of boot critical variables during product development of information handling system 102, in accordance with embodiments of the present disclosure. According to certain embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, during development of BIOS 105, BIOS 105 may execute a training sequence that automatically identifies boot critical variables of NVRAM 122 (e.g., variables that may prevent completion of UEFI POST), and write a list of such boot critical variables to NVRAM 122 for later retrieval. For example, BIOS 105 may execute method 200 or a similar method to identify critical variables.

At step 304, a tool, which may or may not be implemented within BIOS 105, may extract the list of boot critical variables from NVRAM 122 and write such list to a formatted text file. At step 306, such formatted text file may be added to the build for BIOS 105. At step 308, all NVRAM default tables may be pre-processed, such that all boot critical variables set forth in the formatted text file may have a new NVRAM flag "BOOT CRITICAL" which is asserted (e.g., set to "1"). After completion of step 308, method 300 may end.

Although FIG. 3 discloses a particular number of steps to be taken with respect to method 300, it may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102, components thereof or any other system operable to implement method 300. In certain embodiments, method 300 may be implemented partially or fully in software and/or firmware embodied in computer-readable media.

FIG. 4 illustrates a flowchart of an example method 400 for a write operation of a variable to NVRAM 122, in accordance with embodiments of the present disclosure. According to certain embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, BIOS 105 may determine if an NVRAM variable to be written has its "BOOT_CRITICAL" flag set. If the "BOOT_CRITICAL" flag set is set for such variable, method 400 may proceed to step 404. Otherwise, method 400 may end.

At step 404, BIOS 105 may determine if data for the NVRAM variable to be written matches data for the same variable set forth in a current NVRAM default map. If data for the NVRAM variable to be written matches data for the same variable set forth in a current NVRAM default map, method 400 may end. Otherwise, method 400 may proceed to step 406.

At step 406, BIOS 105 may write the NVRAM variable to NVRAM 122, and also write a backup variable to NVRAM 122. For example, to write the backup variable, BIOS may write to an NVRAM variable with the same name, but with an exclusive OR of the original GUID for the NVRAM variable. Exclusive OR may be used for configuring the GUID of the backup variable, simply because exclusive OR toggles all bits of the randomly assigned GUID, so the result is very unlikely to collide with an existing GUID. In these and other embodiments, other approaches could be used to generate a non-colliding GUID for the backup variable. After completion of step 408, method 400 may end.

Although FIG. 4 discloses a particular number of steps to be taken with respect to method 400, it may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102, components thereof or any other system operable to implement method 400. In certain embodiments, method 400 may be implemented partially or fully in software and/or firmware embodied in computer-readable media.

Figure 5:
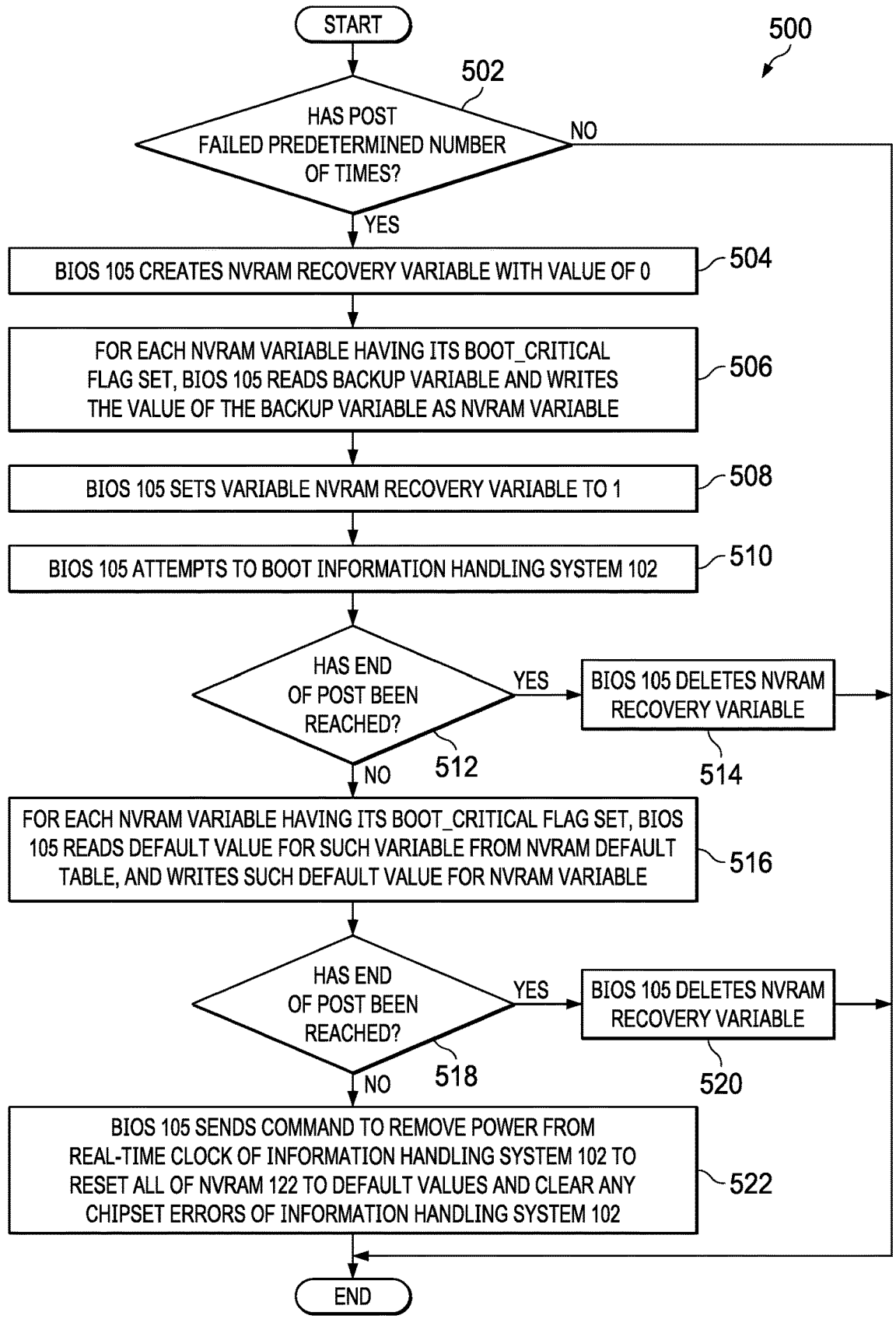
FIG. 5 illustrates a flowchart of an example method for handling an incomplete POST, in accordance with embodiments of the present disclosure.

FIG. 5 illustrates a flowchart of an example method 500 for handling an incomplete POST, in accordance with embodiments of the present disclosure. According to certain embodiments, method 500 may begin at step 502. As noted above, teachings of the present disclosure may be implemented in a variety of configurations of information handling system 102. As such, the preferred initialization point for method 500 and the order of the steps comprising method 500 may depend on the implementation chosen.

At step 502, responsive to a failure of completion of UEFI POST by BIOS 105, BIOS 105 may determine if POST has failed a predetermined number of times (e.g., three). If POST has failed the predetermined number of times, method 500 may proceed to step 504. Otherwise, method 500 may end.

At step 504, BIOS 105 may create an NVRAM recovery variable (e.g., variable "NVRAM_recovery") with a value of 0. At step 506, for each NVRAM variable having its BOOT_CRITICAL flag set, BIOS 105 may read the backup variable (e.g., saved with a GUID that is exclusive OR'ed with the GUID of the NVRAM default table), and write the value of the backup variable to the NVRAM variable with the original GUID.

At step 508, BIOS 105 may set variable NVRAM_recovery to 1. At step 510, BIOS 105 may attempt to boot information handling system 102. At step 512, BIOS 105 may determine if the end of POST is reached. If the end of POST is reached, method 500 may proceed to step 514. Otherwise, method 500 may proceed to step 516.

At step 514, if the end of POST is reached, BIOS 105 may delete variable NVRAM_recovery. After completion of step 514, method 500 may end.

At step 516, for each NVRAM variable having its BOOT_CRITICAL flag set, BIOS 105 may read the default value for such variable from an NVRAM default table, and write such default value for the NVRAM variable. At step 518, BIOS 105 may determine if the end of POST is reached. If the end of POST is reached, method 500 may proceed to step 520. Otherwise, method 500 may proceed to step 522.

At step 520, if the end of POST is reached, BIOS 105 may delete variable NVRAM_recovery. After completion of step 520, method 500 may end.

At step 522, BIOS 105 may send a command (e.g., to an embedded controller of information handling system 102) to remove power from a real-time clock of information handling system 102, which may reset all of NVRAM 122 to default values and clear any chipset errors of information handling system 102. After completion of step 522, method 500 may end.

Although FIG. 5 discloses a particular number of steps to be taken with respect to method 500, it may be executed with greater or fewer steps than those depicted in FIG. 5. In addition, although FIG. 5 discloses a certain order of steps to be taken with respect to method 500, the steps comprising method 500 may be completed in any suitable order.

Method 500 may be implemented using information handling system 102, components thereof or any other system operable to implement method 500. In certain embodiments, method 500 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor; and
   a basic input/output system (BIOS) comprising a program of instructions executable on the processor, the basic input/output system configured to:
      during production of the information handling system, determine which variables associated with the BIOS are critical boot variables and flag such variables as critical boot variables; and
      upon occurrence of a predetermined number of failures to complete a power-on/self-test (POST) of the information handling system:
         for each particular critical boot variable of the BIOS stored in a memory associated with the BIOS, read a backup variable for the particular critical boot variable, if available, and write a value of the backup variable as the critical boot variable; and
         attempt to reboot the information handling system with values of the backup variables used for the critical boot variables.

2. The information handling system of claim 1, wherein the BIOS is further configured to:
   upon failure to complete POST following the reboot, for each particular critical boot variable of the BIOS, read a default value for the particular critical boot variable and write the default value as the critical boot variable; and
   attempt to again reboot the information handling system with values of the default variables used for the critical boot variables.

3. The information handling system of claim 1, wherein the memory is a non-volatile random access memory associated with the memory.

4. The information handling system of claim 1, wherein the BIOS is further configured to, in response to performing a write operation associated with a critical boot variable, write a backup variable to the memory in addition to writing a new value of the critical boot variable to the memory.

5. A method comprising, in an information handling system comprising a processor and a basic input/output system (BIOS) comprising a program of instructions executable on the processor:
  during production of the information handling system, determining which variables associated with the BIOS are critical boot variables and flagging such variables as critical boot variables; and
  upon occurrence of a predetermined number of failures to complete a power-on/self-test (POST) of the information handling system:
    for each particular critical boot variable of the BIOS stored in a memory associated with the BIOS, reading a backup variable for the particular critical boot variable, if available, and writing a value of the backup variable as the critical boot variable; and
    attempting to reboot the information handling system with values of the backup variables used for the critical boot variables.

6. The method of claim 5, further comprising:
  upon failure to complete POST following the reboot, for each particular critical boot variable of the BIOS, reading a default value for the particular critical boot variable and writing the default value as the critical boot variable; and
  attempting to again reboot the information handling system with values of the default variables used for the critical boot variables.

7. The method of claim 5, wherein the memory is a non-volatile random access memory associated with the memory.

8. The method of claim 5, further comprising, in response to performing a write operation associated with a critical boot variable, writing a backup variable to the memory in addition to writing a new value of the critical boot variable to the memory.

9. An article of manufacture comprising:
  a processor;
  a non-transitory computer-readable medium; and
  computer-executable instructions carried on the computer-readable medium, the instructions readable by a processor, the instructions, when read and executed, for causing the processor to, in a basic input/output system (BIOS) of an information handling system:
  during production of the information handling system, determine which variables associated with the BIOS are critical boot variables and flag such variables as critical boot variables; and
  upon occurrence of a predetermined number of failures to complete a power-on/self-test (POST) of the information handling system:
    for each particular critical boot variable of the BIOS stored in a memory associated with the BIOS, read a backup variable for the particular critical boot variable, if available, and write a value of the backup variable as the critical boot variable; and
    attempt to reboot the information handling system with values of the backup variables used for the critical boot variables.

10. The article of claim 9, the instructions for further causing the processor to:
  upon failure to complete POST following the reboot, for each particular critical boot variable of the BIOS, read a default value for the particular critical boot variable and write the default value as the critical boot variable; and
  attempt to again reboot the information handling system with values of the default variables used for the critical boot variables.

11. The article of claim 9, wherein the memory is a non-volatile random access memory associated with the memory.

12. The article of claim 9, the instructions for further causing the processor to, in response to performing a write operation associated with a critical boot variable, write a backup variable to the memory in addition to writing a new value of the critical boot variable to the memory.

* * * * *